Nov. 21, 1961     S. A. JONES     3,009,576
SCREENING METHOD AND APPARATUS THEREFOR
Filed Oct. 19, 1959
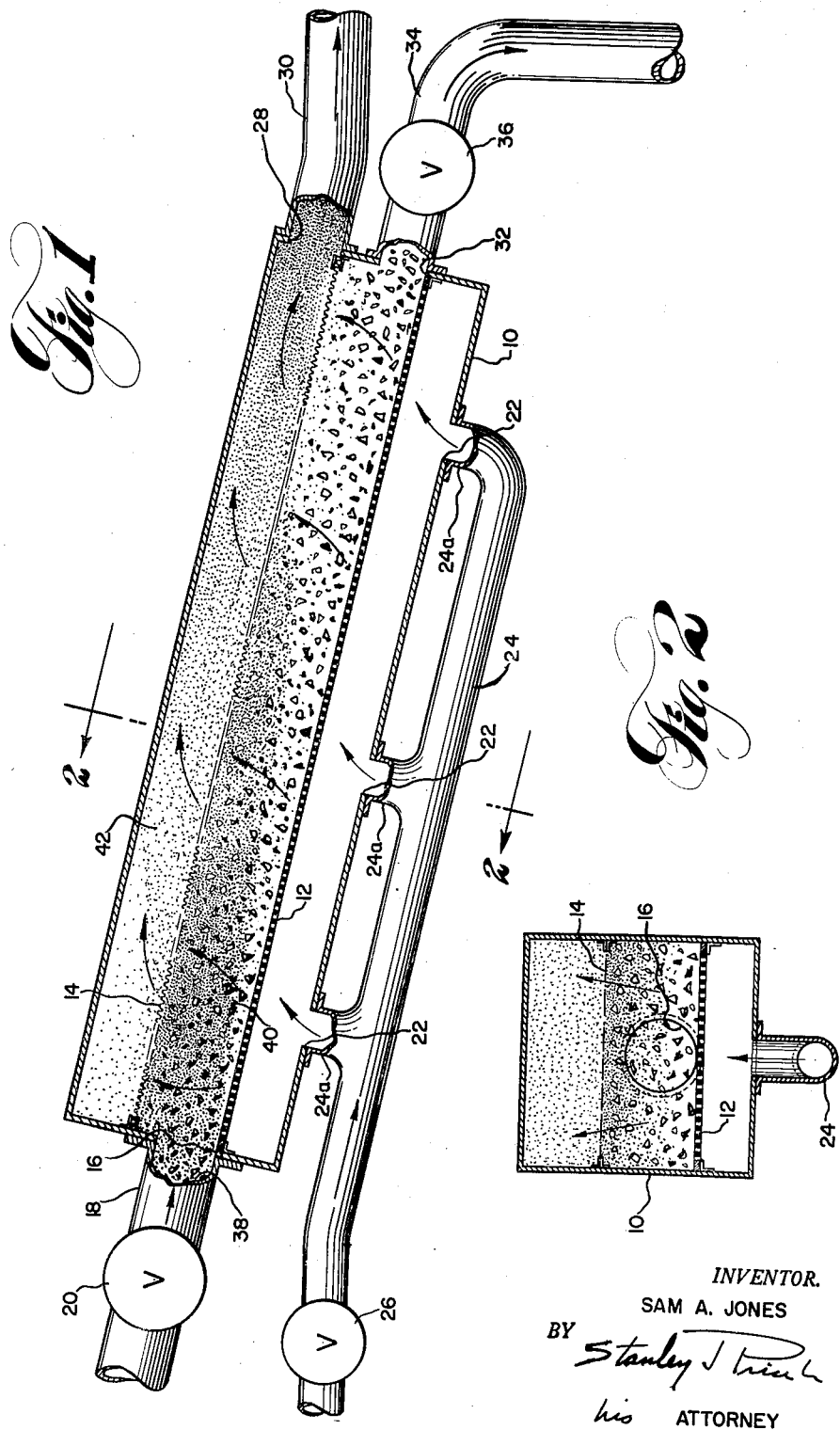
INVENTOR.
SAM A. JONES
BY Stanley J. Price
his ATTORNEY 3,009,576
SCREENING METHOD AND APPARATUS
THEREFOR
Sam A. Jones, Pittsburgh, Pa., assignor to Consolidation Coal Company, Pittsburgh, Pa., a corporation of Pennsylvania
Filed Oct. 19, 1959, Ser. No. 847,393
2 Claims. (Cl. 209—268)

This invention relates to the screening of particulate material comprising various different sized particles to segregate the individual particles according to whether or not the particles will pass through a screen of specified mesh, and more particularly to a novel method and apparatus for continuously performing the screening operation quickly and efficiently.

Screening, that is, the separation of the particles of a mixture of various sized particles into two portions by size, is of two general types referred to broadly as "dry screening" and "wet screening." Dry screening refers to a process where the material handled by the screen contains a natural amount of moisture or where the natural moisture has been removed by drying before screening. Wet screening refers to a screening process where liquid is added to the material before it is delivered to the screen or after it reaches the screen, or both. In either case, a screen of the desired mesh is utilized to separate the mixture into oversize particles which will not pass through the screen and undersize particles which will pass through the screen. It will be understood that the term "mesh" as used herein refers to the mesh of a relatively fine screen which is defined as the number of openings in the screen per linear inch of the screen. Accordingly, a fine mesh screen has a large number of openings per linear inch and only particles of relatively small size may pass through the screen. A coarse mesh screen, on the other hand, has only a few openings per linear inch and particles of larger size may pass through the coarse screen.

The present invention relates to both wet and dry screening. The underlying principles and advantages of the present invention are readily apparent when it is described as applied to the wet screening of a slurry of water and coal in a particulate state. For the purposes of this specification, the invention will be so described. However, it should be understood that the invention can be practiced with other types of materials to be screened, and without a liquid slurry, and therefore is applicable, in its broadest aspects, to dry screening as well as wet screening.

In the conventional method of screening a slurry of water and coal in particulate form, the slurry is passed over a generally horizontally disposed screen of the selected mesh which is slightly inclined to allow flow of the slurry over the screen. At intervals along the screen, a fine spray of water is directed from above the screen downwardly onto the slurry passing over the screen. This fine spray of water is intended to aid in allowing the fine particles within the slurry to pass through the screen.

It has been found that when this conventional method of screening a water slurry of coal is utilized, the screen becomes clogged or "blinded" by a number of near oversize particles which adhere to the screen. By near oversize particles is meant those particles which are just slightly larger than the particles of maximum size which may pass through the screen of the selected mesh.

It has been found that in a slurry of particulate material, the larger particles naturally tend to drop out of suspension first and the finer particles tend to remain in suspension longer. Accordingly, the natural position of the particles within the slurry is for the larger particles to be at the bottom of the slurry, or closer to the screen than the finer particles. Further, when the slurry is watered in the screening process by a spray of water from above, the watering tends to cause laminated cakes of the near oversize material to form on the screen and inhibit passage of the undersize fine particles through the screen.

The present invention, in its broadest aspects, contemplates the provision of a screen of selected, predetermined mesh above a mixture of particulate material of varying particle sizes. Fluid, with a velocity sufficient to carry the fine particles of the mixture upwardly, is then passed into the mixture from below so that the fine particles are carried through the screen. Thus, the particles maintain their natural position; that is, the larger particles are maintained near the bottom of the mixture whereas the finer particles are maintained near the top of the mixture and eventually are carried upwardly through the screen. In practice, the mixture may or may not be contained in a liquid slurry. Further, the fluid passed upwardly through the mixture, henceforth to be called the stripping fluid, may be either a liquid or a gas. Thus, if dry screening is being utilized, a dry mixture of particulate material may be acted upon by a stripping gas thus carrying the fine particles upwardly through the screen.

If wet screening is being practiced, as will be described in detail in this specification, then a liquid slurry of particulate material may be acted upon by a stripping liquid to separate the undersize particles which will pass through the screen of predetermined mesh. When a stripping fluid is utilized to carry the undersize particles upwardly through the screen, the blinding of the screen is substantially eliminated since the fine particles move toward and through the screen with a velocity imparted to them by the stripping fluid. Further, the larger, heavier particles are agitated by the stripping fluid and fall away from the screen to their natural positions below the finer particles.

With the foregoing considerations in mind, it is a primary object of the present invention to provide an efficient method of screening in which the screen is not clogged or blinded by near oversize material during the screening process.

It is another object of the present invention to provide a method of screening which utilizes a stripping fluid to carry the undersize particles upwardly through a screen of the predetermined mesh.

It is another object of the present invention to provide a screening apparatus which may be placed in a slurry feedline to continuously and efficiently separate the fine particles in the slurry from the coarse particles.

These and other objects of this invention will become apparent as this description proceeds in conjunction with the attached drawings.

In the drawings:

FIGURE 1 is a semi-schematic representation in longitudinal section of a screening vessel utilized to practice the present invention.

FIGURE 2 is a transverse sectional view taken along the line 2—2 of FIGURE 1.

Referring now to the drawings in which like reference numerals refer to the same elements in both of the figures, the invention will be described in detail as it relates to the screening of a water slurry of particulate coal. A screening vessel 10 which is elongated in shape is disposed generally horizontally, but is inclined slightly to allow for gravity flow of the slurry to be screened therein. The vessel 10 has a distributing plate 12 disposed adjacent its lower portion.

The distributing plate 12 is preferably formed of punched sheet metal. A series of holes are punched in the metal to provide passages for fluid flow through the distributing plate. The size of the holes in the distributing plate 12 will be determined by the pressure available for the stripping fluid which is to pass through the holes. The holes must be of such size that the fluid will have sufficient velocity when passing through the holes to carry the fine particles of the slurry upwardly with it. As an alternate arrangement, the distributing plate 12 might be formed of relatively coarse screen material.

Disposed adjacent the top portion of the screening vessel 10 is a screen 14 of the desired mesh to separate the particles of the slurry to be screened. The screen 14 will be selected so that all particles smaller than the desired size will pass through screen 14 as undersize particles while particles larger than the desired size will be retained by the screen as oversize particles. The distributing plate 12 and the screen 14 define a separating chamber within the vessel 10. Thus, the actual screening occurs between distributing plate 12 and screen 14 within the separating chamber.

At the elevated end of the screening vessel 10, a slurry inlet 16 is formed to receive slurry inlet conduit 18. The slurry inlet 16 is so positioned that material passing through slurry inlet conduit 18 will enter the separating chamber of the screening vessel 10 between the distributing plate 12 and the screen 14. A slurry inlet control valve 20 is provided to regulate the flow of slurry through the inlet conduit 18. A plurality of stripping water inlets 22 are formed in the bottom vessel 10 below the distributing plate 12. A stripping water inlet conduit 24 conveys water to the inlets 22 by way of the water inlet conduit branch lines 24a. A stripping water inlet control valve 26 is placed in conduit 24 to control the flow of stripping water through the conduit 24.

At the lower end of the screening vessel 10, an undersize particle outlet 28 is formed to communicate with the undersize particle outlet conduit 30. Outlet 28 communicates with the vessel 10 above the screen 14. Thus, material passing through conduit 30 originates in the vessel 10 above screen 14.

Also formed at the lower end of the vessel 10 is a screened slurry outlet 32 which communicates with screened slurry outlet conduit 34. The outlet 32 is so located that screened slurry is withdrawn from the separating chamber of vessel 10 through outlet 32 at a point between the distributing plate 12 and the screen 14. A screened slurry outlet control valve 36 is placed in the outlet conduit 34 to control the flow of the screened slurry through conduit 34.

With the foregoing components of the screening apparatus in mind, the function of the apparatus to screen a slurry of water and coal in particulate form will become readily apparent. The unscreened or raw slurry 38 is introduced into the vessel 10 through slurry inlet conduit 18. The raw slurry 38 consists of oversize particles 40 and undersize particles 42. It is to be understood that the slurry will consist of particles of all sizes ranging from a particular top size to various minute particles. To more clearly illustrate the function of the present invention, the particles have been represented only as oversize and undersize. There has been no attempt to indicate accurately in the drawings the graduated particle sizes which are actually present in a sample of water coal slurry.

Having entered the vessel 10, the raw slurry 38 is pumped and also flows by gravity down the inclined distributing plate 12. At this time, stripping water from a water source (not shown) is introduced into the water inlet conduit 24 and flows through valve 26 in a direction indicated by the arrow. The water flows upwardly through branch lines 24a, inlets 22, and to the distributing plate 12. The flow of the stripping water is controlled by the stripping water inlet control valve 26 and is so regulated that the stripping water flows upwardly through the distributing plate 12 at a velocity sufficient to carry the fine, undersize slurry particles 42 upwardly with it. This flow of stripping water also prevents the particles of the slurry from passing downwardly through the distributing plate. In most instances, the holes of the distributing plate will be larger than the coarse particles of the slurry.

When the stripping water passes through the slurry above the distributing plate 12, the fine particles 42 from the slurry are carried in suspension by the stripping water upwardly through screen 14. These particles, along with the stripping water, flow from the vessel 10 through undersize particle outlet 28 and particle outlet conduit 30.

The raw slurry 38 which enters the separating chamber of the vessel 10 progresses downwardly along the distributing plate 12 and eventually, after it has been subjected to the stripping water, passes into the screened slurry outlet conduit 34 through outlet 32. The flow of the screened slurry is controlled by the valve 36.

Valve 36 serves to maintain a slight back pressure on the slurry 38 within the separating chamber of vessel 10. This back pressure insures that the stripping water will pass upwardly through the slurry to the area above screen 14. If no back pressure were maintained on the slurry 38 within the vessel 10, the stripping water would follow the path of least resistance and pass out the outlet 32 along with the slurry without carrying the fine particles upwardly through screen 14. Accordingly, some type of flow control means is required in conduit 34. In some instances, the control valve 36 may be replaced by an upwardly extending section of conduit 34 which produces a hydrostatic head to provide the requisite back pressure to the slurry 38 within the vessel 10.

Because of the inclined position of the vessel 10, the fine particles 42 and the excess stripping water which carries the particles through the screen 14 pass into the outlet 28 and eventually into undersize particle outlet conduit 30. It will be appreciated that the stripping water pressure is at all times greater than pressure on the slurry within the separating chamber so that the screening process may be carried on.

When a mixture of particulate material is screened by the method of the present invention, the screen itself remains free from clogging or blinding by near oversize material. Further, when the method is utilized for wet screening, the moisture in the material does not cause a laminated cake to form upon the screen since gravity will keep the screen free of near oversize material.

While the system of this invention has been described in conjunction with the wet screening of particulate material, it is equally applicable to the dry screening of particulate material. For such use, dry mixture would be conducted to the distributing plate 12 as by the use of a pneumatic suspension of the material. A stripping fluid in the form of a gas would then be passed upwardly through the distributing plate to carry the fine undersize particles upwardly through screen 14. Thus, in its broad aspects, this invention provides an improved method for both wet and dry screening.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:
1. Apparatus for continuously screening a water slurry of particulate material to separate from said slurry undersize particles that will pass through a specified screen mesh, said apparatus comprising a screening vessel having a top portion and a bottom portion and having a plurality of inlets and a plurality of outlets, a distributing plate disposed adjacent said vessel bottom portion at an angle to the horizontal whereby said slurry may flow by gravity along said distributing plate, a screen of said specified mesh disposed adjacent said vessel top portion, said screen and said distributing plate forming a separating chamber within said vessel, a slurry inlet conduit communicating with one of said vessel inlets to conduct said particulate material slurry into said vessel separating chamber adjacent the higher end of said distributing plate, a water inlet conduit communicating with another one of said vessel inlets to conduct stripping water into said vessel below said distributing plate, said stripping water flowing upwardly through said distributing plate at a velocity sufficient to carry said slurry undersize particles upwardly through said screen, an undersize particle outlet conduit communicating with one of said vessel outlets to conduct said undersize particles and said stripping water out of said vessel from above said screen, a screened slurry outlet conduit communicating with another one of said vessel outlets to conduct the screened portion of said slurry out of said vessel separating chamber adjacent the lower end of said distributing plate, and a flow control means to control flow through said screened slurry outlet conduit whereby a predetermined minimum back pressure is maintained in said vessel separating chamber between said distributing plate and said screen.

2. Apparatus for screening a water slurry of particulate material to separate from said slurry undersize particles that will pass through a specified screen mesh, said apparatus comprising a screening vessel having a top portion and a bottom portion and having a plurality of inlets and a plurality of outlets, a distributing plate disposed adjacent said vessel bottom portion at an angle to the horizontal whereby said slurry may flow by gravity along said distributing plate, a screen of said specified mesh disposed adjacent said vessel top portion in parallel spaced relation to said distributing plate, said screen and said distributing plate forming a separating chamber within said vessel, a slurry inlet conduit communicating with one of said vessel inlets to conduct said particulate material slurry into said vessel separating chamber adjacent the higher end of said distributing plate, a slurry inlet flow control means to control the flow of said slurry through said slurry inlet conduit, a water inlet conduit communicating with another one of said vessel inlets to conduct stripping water into said vessel below said distributing plate, said stripping water flowing upwardly through said distributing plate at a velocity sufficient to carry said slurry undersize particles upwardly through said screen, a stripping water flow control means to control the flow of said stripping water through said water inlet conduit, an undersize particle outlet adjacent the lower end of said screen conduit communicating with one of said vessel outlets to conduct said undersize particles and said stripping water out of said vessel from above said screen, a screened slurry outlet conduit communicating with another one of said vessel outlets to conduct the screened portion of said slurry out of said vessel separating chamber adjacent the lower end of said distributing plate, and a screened slurry flow control means to control flow through said screened slurry outlet conduit whereby a predetermined minimum back pressure is maintained in said vessel separating chamber between said distributing plate and said screen.

References Cited in the file of this patent

UNITED STATES PATENTS

| | | |
|---|---|---|
| 2,275,849 | Fraser | Mar. 10, 1942 |
| 2,570,035 | Laughlin | Oct. 2, 1951 |
| 2,808,928 | Kaufman | Oct. 8, 1957 |
| 2,874,840 | Simpson | Feb. 24, 1959 |

UNITED STATES PATENT OFFICE
CERTIFICATE OF CORRECTION

Patent No. 3,009,576                    November 21, 1961

Sam A. Jones

It is hereby certified that error appears in the above numbered patent requiring correction and that the said Letters Patent should read as corrected below.

Column 6, lines 15 and 16, strike out "adjacent the lower end of said screen", and insert the same after "outlets' in line 17, same column 6.

Signed and sealed this 19th day of June 1962.

(SEAL)
Attest:

ERNEST W. SWIDER                    DAVID L. LADD
Attesting Officer                    Commissioner of Patents